H. H. ELWELL.

Reversible Knob-Latches.

No. 5,783. Reissued March 10, 1874.

Witnesses.

J. H. Shumway

A. J. Pitkin

The Norwalk Lock Co.
assignees of Henry H. Elwell
Inventor
By Atty.
John R. Earle AM. PHOTO-LITHOGRAPHIC Co. N. Y. (OSBORNE'S PROCESS.)

UNITED STATES PATENT OFFICE.

HENRY H. ELWELL, OF SOUTH NORWALK, CONNECTICUT, ASSIGNOR TO THE NORWALK LOCK COMPANY, OF SAME PLACE.

IMPROVEMENT IN REVERSIBLE KNOB-LATCHES.

Specification forming part of Letters Patent No. 116,697, dated July 4, 1871; reissue No. 5,783, dated March 10, 1874; application filed February 5, 1874.

*To all whom it may concern:*

Be it known that I, HENRY H. ELWELL, of South Norwalk, in the county of Fairfield and State of Connecticut, have invented a new Improvement in Reversible Knob-Latches; and I do hereby declare the following, when taken in connection with the accompanying drawings and the letters of reference marked thereon, to be a full, clear, and exact description of the same, and which said drawings constitute part of this specification, and represent, in—

Figure 1:
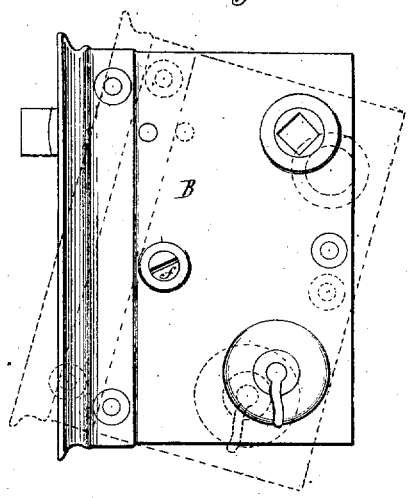
Figure 2:
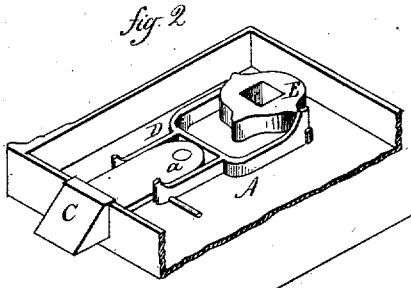
Figure 3:
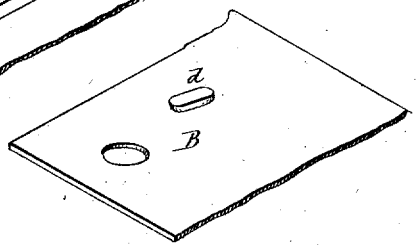

Figure 1, a side view of the latch, the movable plate represented in broken lines as turned for the purpose of reversing; Fig. 2, an interior perspective view of the latch portion of the case with the plate removed; Fig. 3, the plate detached, inverted; and in Fig. 4 a transverse section through the latch-bolt.

This invention relates to an improvement in that class of locks and latches in which the latch-bolt is made reversible, the object being to reverse the latch-bolt without entirely removing or detaching the covering-plate from the case, which exposes the mechanism of the lock and latch to derangement; and it consists in a latch and lock case having the covering-plate of the case attached to the case proper, so as to be partially removed from the case without disconnection therefrom, to allow the reversal of the latch-bolt, and so that when closed the covering-plate will hold the latch-bolt in place.

Figure 4:
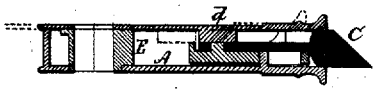

A is the case; B, the covering-plate attached to the case so that it may be partially removed therefrom in the same plane in which it lies upon the case, here represented as by a screw, *f*, which forms a pivot, upon which the plate may be turned, as seen in Figs. 1 and 4. C is the latch-bolt, placed in connection with the yoke D within the case, here represented as by a stud, *a*, from which it may be removed for reversal. The follower E, operating in the usual manner, is set into the case only, and inside the plate B, as seen in Fig. 4. A bearing or projection, *d*, upon the inside of the plate B, lies over the latch-bolt when the plate is in position corresponding to the case, as seen in Fig. 4, so that the plate, when in such position, prevents the reversal of the latch-bolt; but by partially removing the plate B the bolt may be reset to either hand desired, and the plate again closed will secure the latch-bolt.

By this construction the mechanism of the lock or latch is not exposed, and consequently cannot be displaced.

I claim as my invention—

A reversible latch-bolt, in combination with a latch and lock case, having the covering-plate of the case removably attached to the case proper, so as to be partially removed from the case without disconnection therefrom, substantially as described, for the purpose of reversing the latch-bolt, and that when closed the said plate will hold the latch-bolt in its set position.

HENRY H. ELWELL.

Witnesses:
J. H. SHUMWAY,
A. J. TIBBITS.